: 3,366,565
DEVICE FOR TESTING PLASTIC PIPES BY
RELAXATION CRACKING
Mary Naumovich Bokshitsky and Dmitry Fishelevich Kagan, Moscow, U.S.S.R., assignors to Nauchno-Issledovatelsky Institute Sanitarnoi Tekhniki, Moscow, U.S.S.R.
Filed July 17, 1964, Ser. No. 383,444
5 Claims. (Cl. 204—195)

ABSTRACT OF THE DISCLOSURE

A testing device including a vertically displaceable cell containing an electrolyte and a fixed plate provided with mandrels and test specimens adapted for being immersed in the electrolyte as the cell is raised, the mandrel and electrolyte having opposite electrical charges and being insulated by the specimens, such that upon failure of a specimen an automatic recording system registers the closing of the circuit connecting the mandrel and electrolyte.

---

The present invention relates to fatigue tests of plastic products, particularly of polyethylene pipes. There is a known device for testing plastic pipes by relaxation cracking.

The disadvantage of the above device is that it does not permit to determine the exact point of failure of a specimen while this point does not reveal itself by any apparent mechanical effect and it can be visually determined only. It introduces a high percentage of errors, in measuring the durability of a specimen, especially in short-term experiments.

Although the invention is designed to provide testing plastic pipes, it can also be used for all kinds of tests associated with the formation of cracks in the tested specimens.

The object of the present invention is to develop a device which allows detection of the commencement of cracking in a specimen by automatic means.

The object is achieved by the development of device, which is made as a bedplate with a testing electrolytic cell movably mounted on it, said cell being provided with a heater with an automatic temperature controller, said device having a mechanism for vertical displacement and the fixed plate being attached to the bedplate and provided with mandrels to fix and strain test specimens and with an automatic recording system to register the closing of the circuit connecting the mandrel and electrolyte at the point of the failure of the specimen.

The main object of the invention will become apparent from the following detailed description and the accompanying drawings wherein.

Figure 1:
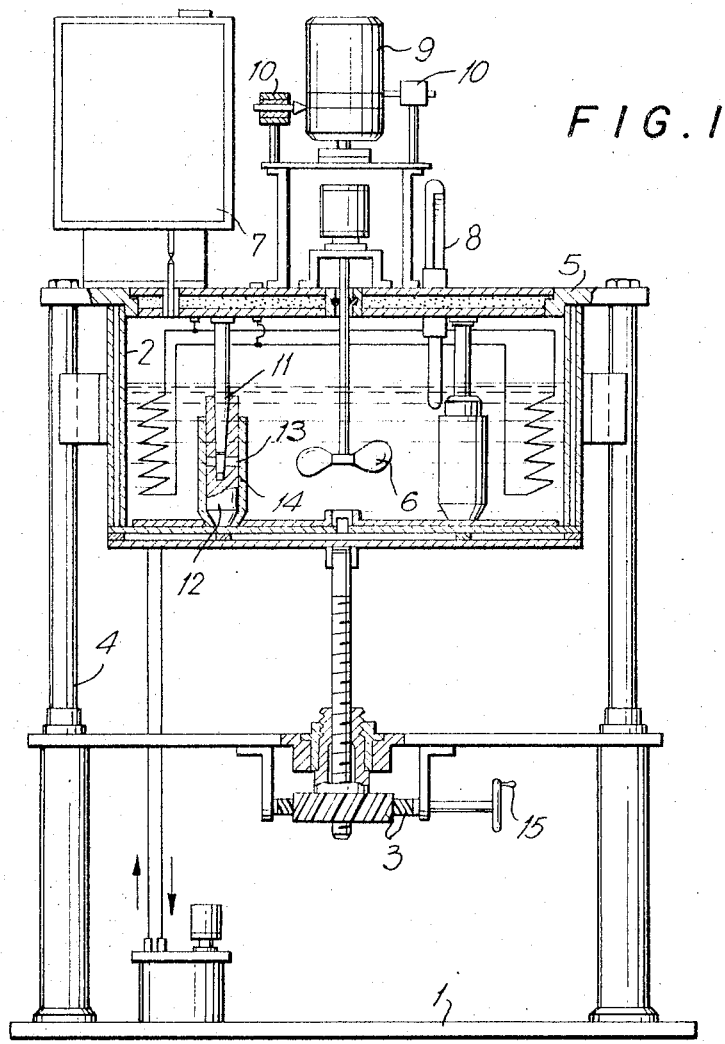
FIG. 1 shows a schematic view of the device for testing polyethylene pipes for relaxation cracking.

The device for the relaxation-cracking tests consists of the following main parts (FIG. 1): a bedplate 1; a testing electrolytic cell 2 (filled with electrolyte) driven by a worm gear drive 3 along columns 4 to the upper part of which is fixed a plate 5 carrying a stirrer 6; a tank 7 with electrolyte; a thermometer 8; and an automatic recording system to register the point of failure, said recording system comprising a drum recorder 9 and an array of pens 10 shifted relative to each other and driven by relays connected in a common circuit in series with cores 11 and mandrels 12, which mandrels are insulated by contacts 13 brought out to the surface of the electrolyte.

The electrolyte is heated in the cell 2 by means of an ultrathermostat or any other heater with the automatic temperature controller.

The device operates as follows.

Prior to testing, pipe specimens 14 together with the mandrels 12 are set on the cores 11. At this time cell 2 is filled with pre-heated electrolyte, said cell being located in its lower extreme position.

The cell is lifted by rotating hand wheel 15 of worm gear drive 3.

When the cell 2 moves up to its upper extreme position the pen of each recorder presses against the tape which is wound on drum 9 and starts drawing on it a straight line, the length of which is commensurate with the duration of an experiment, while mandrel 12 strains specimen 14.

When a failure of the specimen occurs (through fatigue crack) the circuit connecting electrolyte in cell 2 and core 11 closes. The relay is actuated and the pen 10 separates from the surface of the tape. A break in the line corresponds to the point of failure of the specimen.

The specimen durability is thus proportional to the length of the line drawn on the tape which is determined automatically and with high accuracy.

The technique of preparing the mandrels 12 and the pipe specimens can be modified.

Figure 2:
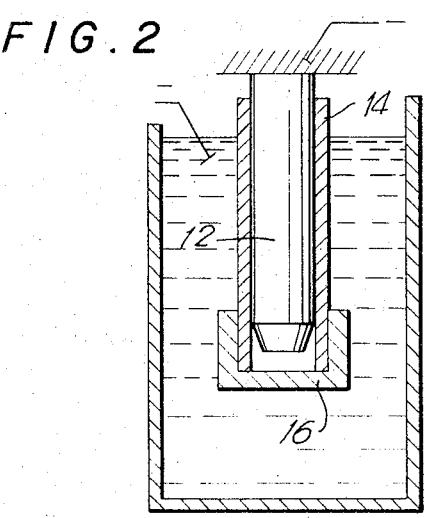
FIG. 2 shows a schematic view of the mandrel with the pipe specimen the end of which is closed by a cap.

FIG. 2 shows the mandrel with the pipe specimen provided with cap 16 on its end. Here the upper end of the pipe specimen is extended somewhat above the surface of the electrolyte. Thus preventing a spontaneous closing of the circuit through the mandrel. Thus it is no longer necessary to place the insulated contacts on the surface of the mandrel. At the point of failure the circuit closes directly through the mandrel.

Figure 3:
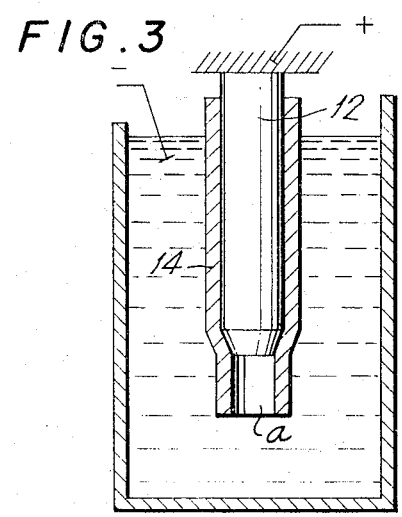
FIG. 3 shows a schematic view of the mandrel with the pipe specimen, which is a little longer than the mandrel.

FIG. 3 shows the mandrel with the specimen somewhat longer than the mandrel.

During the vertical immersion of the specimen into the electrolyte an air plug $a$ forms in the lower part of the former thus preventing closing the electric contact between the mandrel and electrolyte.

Although the present invention has been herein described in view of its preferable embodiment it is evident that changes and modifications may be made without departing from the spirit and scope of the invention as will be easily understood by those skilled in the art. These changes and modifications are considered to be within the limits of the essence and scope of the invention and the hereto appended claims.

What is claimed is:

1. A device for testing plastic pipes by relaxation cracking comprising a bedplate; a cell containing an electrolyte displaceably mounted on said bedplate, said cell being provided with a heater having an automatic temperature controller and with a mechanism for vertical displacement of the cell with respect to the bedplate, a plate attached to said bedplate and adapted to remain fixed as said cell is displaced, at least one mandrel attached to said plate on the side near said cell, a pipe specimen mounted at the end of each mandrel so that each mandrel is forced into the corresponding specimen as the bottom of the cell contacts an end of each specimen in its upward movement, said mandrel and the electrolyte having opposite electrical charges and being electrically insulated from each other by the associated specimen and automatic recording means for registering the closing of a circuit connecting the mandrel and electrolyte upon failure of a specimen.

2. A device as claimed in claim 1 comprising means closing the lower end of each specimen.

3. A device as claimed in claim 2 wherein said closing means comprises a cap at the lower end of each specimen.

4. A device as claimed in claim 1 wherein said recording means comprises a drum and a marking instrument mounted for relative movement as the cell is displaced, and relay means coupled to the marking instrument for displacing the same relative to the drum when said circuit is closed.

5. A device as claimed in claim 1 wherein each specimen is longer than the mandrel, the mandrel and encircling specimen being immersed in the electrolyte as the cell is raised, the extra length of the specimen serving to form an air pocket beneath the mandrel preventing closing of said circuit as the specimen and mandrel are immersed in the electrolyte.

References Cited
UNITED STATES PATENTS

| | | | |
|---|---|---|---|
| 2,978,637 | 4/1961 | Price et al. | 324—54 |
| 3,210,655 | 10/1965 | McGlasson et al. | 324—54 |

HOWARD S. WILLIAMS, *Primary Examiner.*

JOHN H. MACK, *Examiner.*

T. TUNG, *Assistant Examiner.*